April 3, 1973  G. A. GIMENEZ  3,725,025
METHOD FOR HOMOGENIZATION OF MOLTEN GLASS AND ADDITIVES
Filed May 13, 1970
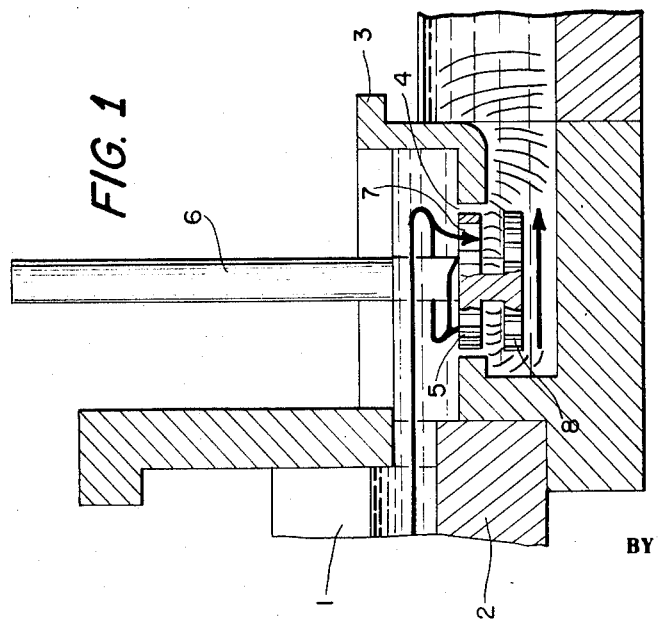
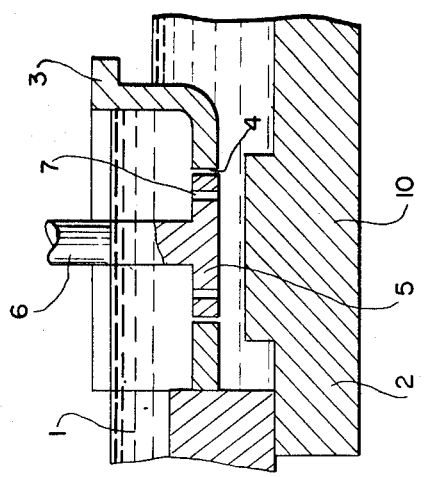
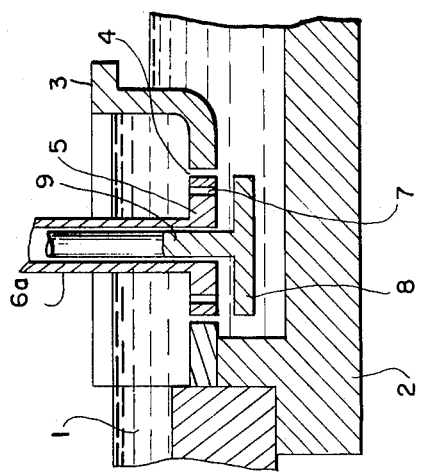
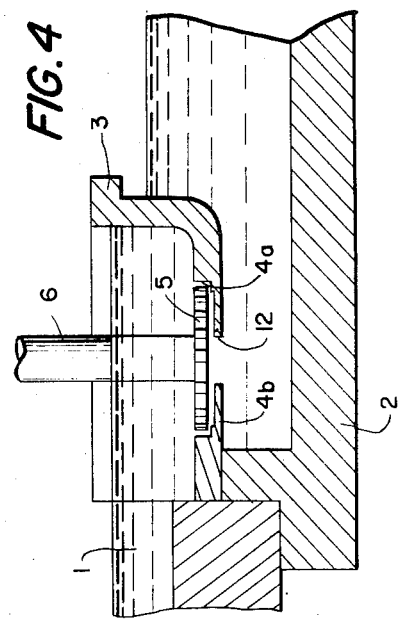
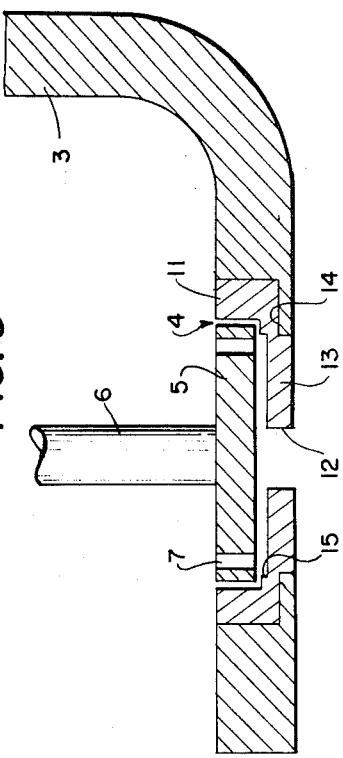
INVENTOR
GERMAN ARTIGAS GIMENEZ
BY Bauer and Seymour
ATTORNEYS

United States Patent Office 3,725,025
Patented Apr. 3, 1973

3,725,025
METHOD FOR HOMOGENIZATION OF MOLTEN GLASS AND ADDITIVES
German Artigas Gimenez, Aviles, Oviedo, Spain, assignor to Saint-Gobain, Neuilly-sur-Seine, France
Filed May 13, 1970, Ser. No. 22,254
Claims priority, application France, Mar. 25, 1969, 6908758
Int. Cl. C03b 5/16, 5/18
U.S. Cl. 65—134                   5 Claims

ABSTRACT OF THE DISCLOSURE

Method and apparatus for the homogenization of molten glass and additives thereto, flowing in the feeder channel of a glass-melting furnace. The glass flow is broken up into a multiplicity of small vertical streams or filaments which are then re-combined by and between two closely-spaced horizontal superposed surfaces. The upper surface may be a disk rotating about a vertical axis and comprising a multiplicity of apertures through which the molten glass flows. The lower surface may be fixed, or a disk rotatable as a unit with the upper disk, or independently but coaxially in the opposite direction, or in the same direction but at speed different from the upper disk.

---

This invention relates to a method and apparatus for the homogenization of molten glass and any additives thereto.

The homogenization of molten glass before it is drawn from a melting furnace, is a highly important matter. This is particularly so where the glass is being drawn a relatively small quantity at a time, as in the manufacture of articles which are intended to be of constant uniform quality. Under such conditions it is highly desirable that all quantities of molten glass so drawn, are of the same and identical physical and chemical characteristics. For instance, where the articles being formed are colored, it is absolutely necessary that the colorant be uniformly distributed in and through the molten glass being drawn as, otherwise, differences in shades and tints of color will be noticeable in and between the finished articles.

Previously it has been very difficult to thoroughly homogenize, as by agitation, molten glass being drawn from the melting furnace or, more accurately, from its feeding channels or canals. This is especially so where the furnace is supplying molten glass from several outlets to as many feeders, as in the fabrication of different articles. In such procedures, it is customary to modify the physical and/chemical characteristics of the base glass, that is, the fined glass as it exists in the forehearth of the furnace, especially as to coloring thereof, by adding colorant or like materials into the glass as it flows in and along the feeder channels leading from the forehearth.

Such added colorants or like materials may have to be added to each feeder in proportion varying with the type or kind of article being fabricated by glass drawn from each channel. Where the additive is being introduced into the fined base glass as it exists in the forehearth of the furnace it is usual to supply such additive in the form of frit, added at an essentially constant rate. The frit can be added to the base glass while in solid particulate form or, alternatively, in molten condition.

But however the additive is supplied, it is absolutely necessary to thoroughly and completely homogenize it with the molten viscous mass of high-temperature glass flowing in the feeders supplied by the furnace; and for that purpose many different types of mixing mechanisms have been proposed. Conventionally such mechanisms take the form of rotary devices such as bladed propellers or disks of various forms and constructions. Indeed, the many variations of mixers thus proposed are per se, evidence of the fact that none of them have proven entirely satisfactory for their intended purpose of essentially perfect homogenization of the molten glass and its additives, before the mixture is drawn from the feeders.

The present invention affords a method and an apparatus which, as subsequently shown, effects an essentially perfect homogenization of the mass of molten glass flowing in and from each feeder of a glass-melting furnace.

It is the chief object and purpose of the invention to provide a method of, and apparatus for the homogenization of molten glass in a feeder channel, by dividing the horizontally-flowing glass into a plurality of filament-like individual streams which are diverted into the vertical, then reunited by descent onto a horizontal surface so that the streams are laminated by and between two horizontal surfaces vertically spaced by a small distance.

In accordance with the invention the division of the flowing molten glass into a multiplicity of generally vertical streams, the union of such streams on a horizontal surface, and the subsequent abrupt and complete change in direction of flow of the resulting lamina, between horizontal, vertically-spaced surfaces, effects an extremely thorough and energetic mixing of the glass and results in an intimate thorough homogenization therewith of the various ingredients and additives such as has not been previously possible of attainment.

Equally important, it is an object of the invention to provide an apparatus for the carrying into practice of the method. Such apparatus comprises a basin of refractory material, having a circular aperture in its floor or bottom wall. The basin is incorporated or emplaced in the flow path of the molten glass in the distribution channel or feeder leading from the furnace. One element in the form of a disk is rotatably mounted in and partially obturates the aforesaid aperture. The rotary element or disk is provided with a multiplicity of circumferentially-spaced flow orifices therethrough which break up the downward flow into filament-like streams. These streams impinge upon an essentially horizontal element or surface positioned a small distance below the rotary disk. Means are provided to rotate about its vertical axis, at least one of these elements so that the glass streams or filaments are re-united and laminated between the relatively rotating confronting horizontal surfaces of the elements.

Several embodiments of the apparatus as generally described in the preceding paragraph are subsequently described and shown. The first element or disk may, for instance, be fixed to the vertically-disposed shaft of a motor. The second element or horizontal surface may be formed of a disk fixed with the same shaft as the first element. Alternatively it may be fixed to a second shaft rotatable coaxially with the shaft to which the first element is attached. The latter alternative has the advantage of enabling the two elements to be rotated at different rates of speeds in the same or in opposite directions. For instance, the shaft to which the first element is affixed may be tubular and the shaft carrying the second element may be journaled for rotation in and extending along and below the first shaft, as subsequently described. It is also contemplated that the second element may be fixed, for instance, as an integral part of the floor of the aforesaid basin or of the feeder.

The flow orifices in and through the first disk or element may be vertical or inclined at an angle to the vertical. If inclined the direction of inclination is so correlated with the direction of rotation that the orifices act as impellers upon the mass of molten glass traversing them and thus increase the homogenization effect.

Numerous other objects and advantages will become clear to those skilled in the art, after a study of the following detailed description and examples, in connection with the accompanying drawing.

In the drawing:

FIG. 1 shows a first embodiment and also illustrates the manner in which molten glass and additives thereof, are homogenized;

FIG. 2 shows a second embodiment wherein the two disks or elements are or may be individually rotated in the same or in opposite directions and at relatively different speeds;

FIG. 3 shows a third embodiment wherein the lower or second element or disk is fixedly mounted;

FIG. 4 illustrates an embodiment generally like FIG. 3, that is, with fixed lower disk having a special annular form; and FIG. 5 is a view to an enlarged scale of the upper and lower disks or elements of FIG. 4.

Referring in detail to FIGS. 1 and 2, a mass of molten glass 1 in a feeder generally identified at 2, passes into a shallow basin 3. The basin is of refractory material and may have an open top. The floor or bottom wall of the basin has a circular opening therethrough. A disk or element 5 is located in and partially obturates opening 4.

Disk 5 is fixed to the lower end of a shaft 6 and has orifices 7 therethrough and through which the molten glass may flow downwardly in the form of a multiplicity of independent streams or filaments. The streams pass downwardly and impact a second disk or element 8 located a small distance below upper disk 5. Excellent results have been attained where the disks are spaced up to 30 mm. Disk 8 has no orifices but to the contrary is imperforate. Thereby the mass of molten glass is laminated by and between the two disks, when at least upper disk 5 is rotated by torque applied to its shaft 6. For example, this shaft may be a continuation of the shaft of an electric motor. Further mixing of the glass is effected by and between the lower surface of disk 8 and the bottom wall of the feeder, so that a very complete homogenization of the glass is thereby effected.

In FIG. 1, lower disk 8 is also fixed to shaft 6 and therefore rotates in the same direction and at the same speed as disk 5.

While the arrangement and disposition of parts as shown upon FIG. 1 gives very satisfactory results, the rate of mixing and homogenization can be enhanced by mounting disk 8 so that it may be independently rotated as shown upon FIG. 2. In this latter figure parts 2 through 5 may be the same and similarly related as in FIG. 1. Thus they are identified by the same reference numerals.

However, shaft 6a may be tubular as shown, and disk 8 which may be of the same form and construction as in FIG. 1, is fixed to the lower end of a shaft 9 journaled for independent rotation in and with respect to shaft 6a. Thus the two disks may be rotated independently either in the same direction at relatively different speeds or in opposite directions. For instance the two shafts may be each connected to the armatures, not shown, of respective motors one or both of which may be reversible. Alternatively both disks may be connected to the shaft of one and the same motor, each through its own reversible, variable speed gearing of known construction. In this form shown at FIG. 2, therefore, the molten glass may be mixed at a selected rate.

Very satisfactory homogenization of the glass passing to the feeders may also be effected when the second element or disk is fixed in horizontal position, as shown upon FIG. 3. In this embodiment the parts 2 through 5 may be of the same construction and relation as in FIG. 1. Also disk 5 may have orifices 7 as shown and described in connection with FIG. 1. The floor or bottom wall of feeder 2 is provided with an integrally-fixed abutment 10 having a flat horizontal upper surface disposed vertically below and in slightly spaced relation with upper disk or element 5. The operation of this embodiment is essentially like that described for FIG. 1. It has the added advantage of simplicity and inexpensive construction.

Referring to FIGS. 4 and 5, the feeder 2, basin 3, disk 5 and shaft 6 may be of the same construction as in FIG. 1. However, the circular opening 4a in the bottom wall of basin 3 is formed with a radially and inwardly extending bottom flange 4b which, effectively forms the second disk or element corresponding to element or disk 8, previously described. The inner periphery of this flange defines an opening 12 through which the homogenized molten glass flows on its way to discharge. As clearly shown upon FIG. 5 the flange is formed in an annulus 13 removably fitting a stepped opening 14 in the bottom wall of basin 3. The annulus may be non-circular or be provided with radial projections, not shown, fitting corresponding depressions in the basin floor, so that it cannot rotate but, when necessary may be lifted out for repair or replacement. As noted, the inner peripheral wall of the annulus is stepped as indicated at 15, FIG. 5, to impart added turbulence and homogenization to the glass traversing the opening in the annulus.

The parts such as 3, 5, 6, 11, etc. are of materials capable of resisting the high temperatures involved. Such materials may be, for instance, refractory steel such as chromenickel alloy, molybdenum or platinum-plated metal. Metals of refractory alloys are particularly advantageous because of the relative ease with which they may be machined or surfaced. This enables the disk or element 5 to be provided with a large number of orifices 7 of small diameter so that the molten glass is broken up into a great number of fine filamentary streams, thus assuring excellent homogenization. Another advantage in the use of metallic elements as aforesaid resides in the fact that it is thereby possible to add complementary heating means for the mass of glass traversing the mixer. Such complementary heat can be supplied by one or more electric heaters.

I also contemplate that there may be two mixers such as the one shown upon FIGS. 1 and 2, arranged in series in the same feeder. In such an arrangement there may be two disks such as 5, each fixed to its own respective one of two shafts disposed to rotate on laterally-spaced parallel vertical axes or, alternatively, fixed to one and the same vertical shaft and thus rotated by the same motor or other prime mover.

As previously noted it is also contemplated that orifices 7 in disk 5 may be inclined to the vertical. The direction of inclination will be so correlated with the direction of rotation of the disk, that the molten glass is positively impelled through the disk, thus compensating for inertia of the molten glass in traversing the orifices. It is also possible to form the lower face of upper disk 5, and the upper face of lower disk 8 with protrusions or embossments forming blades or impellers which enhance turbulence and homogenization of the glass passing to and through the upper disk.

To demonstrate the improved blending and mixing afforded by my invention, examples are subsequently given, of the homogenization of glass of the composition commonly used in making bottles, first by prior art procedures and secondly of the homogenization of the same kind or composition of glass by the present method, first with one apparatus and secondly with two apparatuses such as the one shown upon FIG. 1, arranged sequentially, that is, in series in the same distribution channel or feeder.

In order to show the quantitative homogeneity of the glass, conventional means were employed to measure optically the tensions in zones of the glass after annealing. Such means embodied a Babinet compensator which gathered the polarized light traversing a specimen such as an annulus cut from the body of a bottle and having a height of 1 cm. In order to eliminate residual tensions of annealing, the annulus was open. The recorded observed values were taken in a direction perpendicular to the axis of the specimen, that is, to the axis of symmetry of the bottle from which it was cut. As a criterion or measure of homogeneity there are shown in the following examples, the maximum readings for the external surface of the annulus specimen and the absolute maximum tensions therein. The results are expressed in millimeters of deviation as produced in the Babinet compensator. In the testing apparatus used, 1 mm. of deviation as read from the compensator, corresponded to an optical retardation of 113 m$\mu$, that is, millimicrons or nanometers.

Resulting indicated values were as follows:

(1) Glass fabricated in accordance with prior art procedures:

(a) Exterior surface:
  Extension—0.30 mm. (34 m$\mu$ optical retardation)
  Compression—0.60 mm. (68 m$\mu$ optical retardation)
(b) Absolute maximum:
  Extension—0.59 mm. (57 m optical retardation 9ög0
  Compression—0.85 mm. (96 m$\mu$ optical retardation)
(c) Absolute contiguity—1.20 mm. (135 m$\mu$)

The foregoing values are those normally corresponding to glass of so-called "commercial quality."

(2) Glass homogenized in accordance with the method and apparatus of the present invention, using one set of mixer elements:

(a) Exterior surface:
  Extension—0.0 mm.
  Compression—0.20 mm. (23 m$\mu$ optical retardation)
(b) Absolute maximum:
  Extension—0.10 mm. (11 m$\mu$ optical retardation)
  Compression—0.20 mm. (23 m$\mu$ optical retardation)
(c) Absolute contiguity—0.30 mm. (34 m$\mu$)

The characteristics of homogeneity as given in Example 2, correspond to glass known in the art as "good commercial quality."

(3) Glass homogenized by two apparatuses in series, both constructed and arranged in accordance with the present invention:

(a) Exterior surface:
  Extension—0.0 mm.
  Compression—0.10 mm. (11 m$\mu$ optical retardation)
(b) Absolute maximum:
  Extension—0.0 mm.
  Compression—0.10 (11 m$\mu$ optical retardation)
(c) Absolute contiguity—0.10 mm. (11 m$\mu$ optical retardation)

The values obtained in Example 3 correspond to those of glass of perfect commercial quality.

The high quality of glass produced in Examples 2 and 3, above given, is due to, and illustrates clearly the greatly improved homogenization effected by the present invention. FIG. 1 shows graphically how the glass stream coming from feeder 2 is broken up into a large number of small streams or filaments as it traverses the rotating disk or disks and their subsequent re-combination into a highly homogenized stream flowing to discharge.

As numerous substitutions of equivalents and modifications will readily occur to those skilled in the art after a study of the foregoing disclosure, such disclosure is to be taken in an illustrative sense only.

Having fully disclosed the invention, what I claim and desire to secure by Letters Patent is:

1. The method of homogenization of a stream of molten glass flowing horizontally from the forehearth of a glass-melting furnace, comprising, passing the stream vertically downwardly through a restricted opening, breaking up the flow of glass traversing the opening, into a multiplicity of essentially vertical filamentary streams and immediately directing the filamentary streams between two horizontal, contiguous, vertically-spaced, relatively-moving surfaces to thereby recombine them into a single reconstituted layer of molten glass.

2. The method of claim 1, said reconstituted layer having a speed higher than that of the filamentary streams.

3. The method of claim 1, the filamentary streams being recombined as aforesaid by directing them between two essentially horizontal, vertically-spaced contiguous surfaces relatively rotating about an essentially vertical axis.

4. The method of claim 3, said rotating surfaces acting centrifugally to recombine the filamentary streams, as aforesaid.

5. The method of claim 3, said rotating surfaces acting centripetally to recombine the filamentary streams as aforesaid.

References Cited
UNITED STATES PATENTS

| | | | |
|---|---|---|---|
| 2,038,190 | 4/1936 | Morton | 65—179 X |
| 2,730,338 | 1/1956 | Gregorius | 65—178 X |
| 2,871,000 | 1/1959 | Dowling | 65—178 X |
| 3,358,066 | 12/1967 | Tiede et al. | 65—178 X |
| 3,350,187 | 10/1967 | Brichard et al. | 65—178 X |
| 1,737,525 | 11/1929 | Soubier | 65—178 X |
| 1,988,783 | 1/1935 | Canfield | 65—179 X |
| 2,570,079 | 10/1951 | Spremulli | 65—178 X |
| 3,352,659 | 11/1967 | Rahe | 65—134 X |

FRANK W. MIGA, Primary Examiner

U.S. Cl. X.R.
65—178, 179